Sept. 16, 1924.  H. W. TURNER  1,508,826
CYCLE FRAME
Filed Nov. 14, 1922
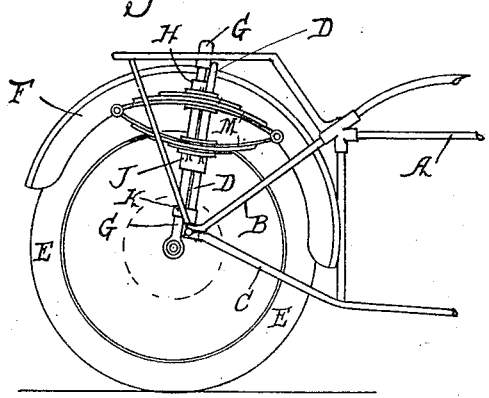
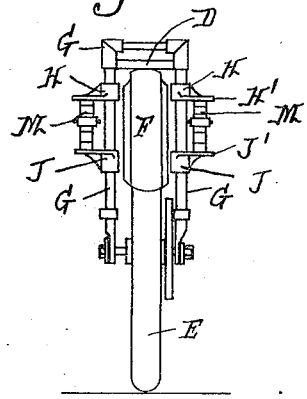
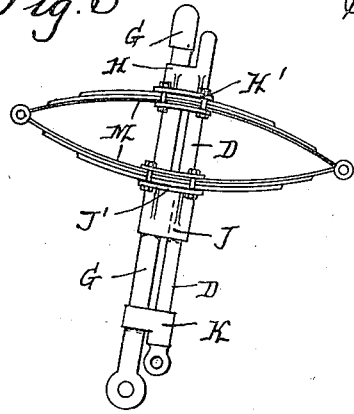
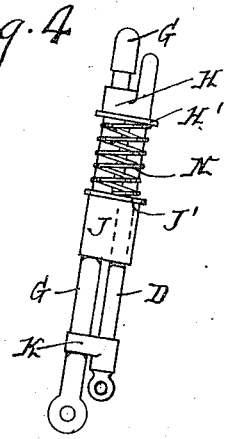
Inventor.
Herbert William Turner
By Arthur ...
Atty.

Patented Sept. 16, 1924.

1,508,826

UNITED STATES PATENT OFFICE.

HERBERT WILLIAM TURNER, OF AUCKLAND, NEW ZEALAND.

CYCLE FRAME.

Application filed November 14, 1922. Serial No. 600,797.

*To all whom it may concern:*

Be it known that I, HERBERT WILLIAM TURNER, subject of the King of Great Britain, residing at Auckland, New Zealand, have invented new and useful Improvements in or Relating to Cycle Frames, of which the following is a specification.

My invention relates to the frames of cycles, and particularly motor cycles, and has for its object to provide improvements in the construction of such frames by the employment of which, the frame at its rear in its bearing on the rear wheel, may be more effectively spring cushioned, or reversely, the rear wheel may be spring cushioned within the frame.

The invention consists therefor in a special construction of frame having springs embodied therein by means of which the said results may be obtained.

These means are of such a nature that the rear wheel is journalled between the lower ends of a framing made of inverted fork form while the rear ends of the ordinary frame are attached to the respective lower ends of a similarly shaped inverted fork framing. These two framings are connected together by sleeves or guides surrounding their vertical side members and allowing for one moving relatively to the other in the vertical plane. The one framing is then supported upon the other by cushion springs interposed between brackets on their side members, so that the framing supporting the main frame of the cycle is carried by that in which the rear wheel is journalled. These springs will thus cushion the rear of the frame upon the rear wheel and will serve to absorb the jolts and running shocks to which the rear wheel is subjected.

In the accompanying drawings:—

Figure 1 is a side elevation of the rear part of the cycle frame made in accordance with this invention.

Figure 2 is a back elevation thereof.

Figure 3 is an enlarged side elevation of the special features of the invention, illustrating the manner in which bow springs are employed to obtain the cushioning result.

Figure 4 is a similar view but illustrating the manner of using helical cushion springs.

A represents the main frame of the cycle which as to its general features, is constructed in any of the ordinary ways suitable for adaptation to the particular means for propulsion to be embodied therein.

In this invention the rear wheel diagonal forks B and C of this frame, where they connect, are attached to the respectively lower ends of a fork shape framing D, which extends down on each side of the rear wheel E and across the top of the main frame. F is the mudguard. A second frame G, of similar fork shape, is provided, and disposed to extend with its side members parallel with and to the rear of the corresponding side members of the framing D. The wheel E is then journalled in the lower ends of this framing by means of any of the usual methods. The top cross member of this framing G is disposed at a height above the cycle frame such as to allow for the maximum amount of cushioning movement to be provided for the frame upon its wheel.

The side members of the two frames D and G, on each side of the machine, are linked together in such a manner that they may slide longitudinally, independently of each other, but so that the wheel is kept in its proper position relatively to the main frame. This is effected by providing a sleeve guide H on the frame D near its upper end so that this guide envelopes the portion of the frame G adjacent to it, and by providing a similar sleeve guide J on the frame G at a lower point, so that it envelopes the portion of the frame D adjacent to it. In addition, they are connected at their bottom ends by a guide K fixed to the bottom of the frame D and loosely encircling the frame G.

The sleeve guides H and J on each side of the machine, are both formed with a bracket H'—J' extending laterally outwards therefrom. Between the brackets, the cushion spring employed is arranged to extend, this spring being in the case of the construction shown in Figures 1 to 3, a double elliptical spring M, and in the case of the construction shown in Figure 4, a helical spring N. In either case the spring is in compression so that it cushions one bracket against the other.

As the sleeve guides H and K on each side are fixed to the frame D, and the sleeve guide J is fixed to the frame G, and the two frames may slide longitudinally one on the other, and the frame G has the wheel journalled in it, while the frame D supports the main frame of the machine, it is apparent that the springs will cushion the weight of the frame on the wheel and will also absorb the shocks to which the wheel is subjected in the travel of the machine.

I claim:—

1. In a cycle frame, the combination with the main frame, of a forked frame arranged to extend down on both sides of the rear wheel and fixed at its lower ends to the main frame, and a second frame of similar shape, between the lower ends of which the rear wheel is journalled, such frames being so disposed that their side members extend parallel with one another on each side of the wheels, means whereby the two frames are linked together so that they may move relatively up and down, and spring cushions interposed vertically between the two said frames.

2. In a cycle frame, the combination with the main frame, of a forked frame extending down on both sides of the rear wheel, and fixed at its lower ends to the said main frame, a second frame of similar shape, between the lower ends of which the rear wheel is journalled, a guide sleeve provided on each side member of each frame and arranged to encircle the corresponding side member of the other frame, such guide sleeves being disposed one above the other, a bracket on each guide sleeve arranged to project laterally outwards therefrom, and a spring arranged in compression between the said brackets.

In testimony whereof, I affix my signature.

HERBERT WILLIAM TURNER.

Witnesses:
 EDWARD HAWLEY PORTICIO,
 DAVID BROWN HUTTON.